W. S. ROCKEY & H. ELDRIDGE.
PROCESS OF FUSING AND PURIFYING COPPER.
APPLICATION FILED FEB. 27, 1911.
1,018,681.
Patented Feb. 27, 1912.
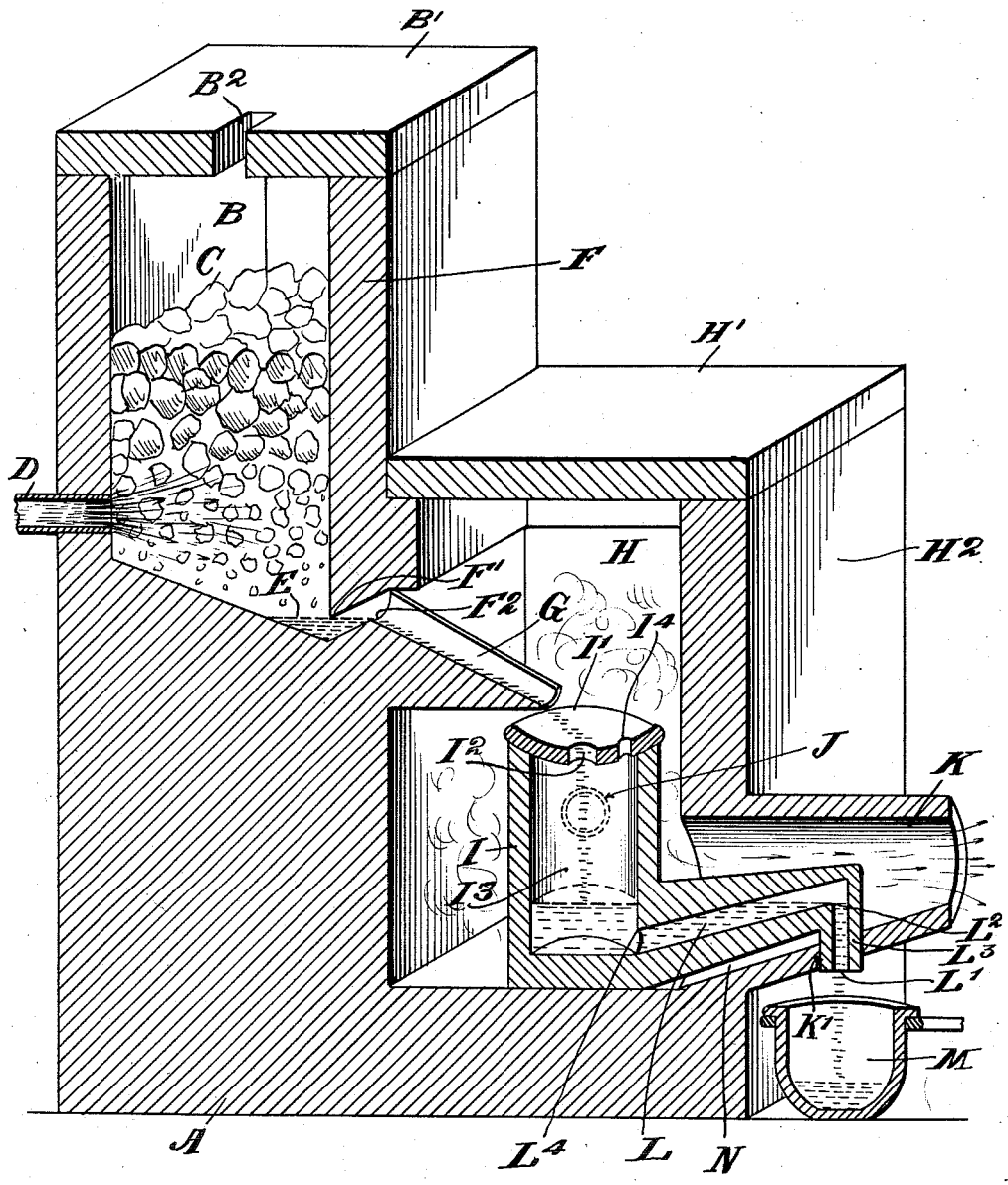

UNITED STATES PATENT OFFICE.

WALTER S. ROCKEY AND HILLIARY ELDRIDGE, OF NEW YORK, N. Y., ASSIGNORS TO METALLURGICAL RESEARCH COMPANY, A CORPORATION OF ARIZONA TERRITORY.

PROCESS OF FUSING AND PURIFYING COPPER.

1,018,681.      Specification of Letters Patent.      Patented Feb. 27, 1912.

Application filed February 27, 1911. Serial No. 611,188.

*To all whom it may concern:*

Be it known that we, WALTER S. ROCKEY and HILLIARY ELDRIDGE, citizens of the United States, and both residing at New York city, in the county of New York and State of New York, have invented certain new and useful Improvements in the Process of Fusing and Purifying Copper, of which the following is a full, clear, and exact specification.

Our invention relates to the fusing of copper, and more particularly to the fusing of cathode copper.

The object of our invention is to fuse copper on a large commercial scale, and to purify the copper from impurities which are absorbed by it in the fusing operation when fused in a chamber which is exposed to the furnace gases and products of combustion.

Cathode copper is an electrolytic product of great purity, high electrical conductivity, but low tensile strength which is due to crystallization by electrolysis during manufacture. When fused under proper conditions this crystallization is destroyed by the fusion, and tensile strength attained. Cathode copper after manufacture must be fused so as to be cast into various forms for commercial uses, which require purity, electrical conductivity and tensile strength.

The combination of carbonaceous fuel with oxygen which is termed combustion, produces several compounds which vary in their properties, and whose production are incidental to the character of the fuel used. One of these which is an invariable and certain product of carbonaceous combustion is carbon monoxid CO. It is obvious that should the cathode copper, previously described, be fused by and in the heat and flame which are produced by the combustion of carbonaceous fuel, and exposed during the fusion to the action of atmospheric oxygen which supports the combustion, that copper oxid would be formed by the union of a percentage of the oxygen with a percentage of the molten copper.

That the copper is contaminated during fusion is well known by those skilled in the art of copper refining, and it is generally believed that the contamination is caused by copper oxid (termed sub-oxid) being present in the copper, hence the aim and intent of the well-known process of purification by treatment with carbon, is to reduce the copper oxid with carbon assisted by auxiliary treatment known as rabbling and poling which process is actually and primarily a reduction of copper carbonate to copper oxid by carbon, and then a reduction of the copper oxid to copper by carbon.

We have found that if proper conditions are established the fusing and refining of copper and particularly cathode copper can be successfully accomplished by the simultaneous separation of the vapors and gases such as $CO_2$ or $CO$, etc., from copper by a process of volatilization, and treatment of the copper in an atmosphere of nitrogen, and by gravity, as hereinafter explained. The vapors and gases as formed, volatilizing, rarefying and ascending upward and outward with the furnace gases, and the copper descending by gravity as fused; thus simultaneously separating as the fusing of copper and the formation of the vapors and gases proceeds. The establishment of proper conditions, which are essential for carrying out this process of separation, is founded on two simple natural laws. First, that volatile substances, vapors and gases when heated become more or less rarefied in exact proportion to the temperature employed, and will escape by the path of the least resistance, and ascend and pass out of a furnace or chamber having an outlet. Second, a molten liquid substance will flow by its own gravity downward and outward if an outlet is provided for it to flow through.

To carry out our process we first provide a suitable furnace, preferably a fuel oil furnace which is constructed in two compartments each divided from the other by a compartment wall and each separately heated.

Referring to the drawings which form a part of this specification, the figure discloses a longitudinal sectional view of a furnace in which we may carry out our process.

A indicates the furnace which is provided with a chamber B in which the copper C to be melted is fused.

D indicates a blow pipe which is located near the bottom of the chamber B and by means of which the copper is fused.

E indicates the fused copper which passes under the wall F and flows through a guideway G into a second chamber H in which is located a crucible I. The crucible I is provided with a cover I' which is cone shaped as illustrated and has an opening I² at its center through which the copper flows into the chamber I³. The chamber H is provided with a blow pipe located in one of its side walls and shown in dotted lines and indicated by J. This blow pipe furnishes fuel to the chamber H and keeps the crucible I heated to a point above the temperature of the fused copper and the products of combustion escape through the outlet K to the atmosphere. The fused copper in the crucible I flows upward through a conduit L formed therein and out through the opening L' into the ladle M at a point removed from the furnace gases which escape through the outlet K.

It will be noted that the highest point of the conduit L is located at L² and the lowest point of the conduit is indicated at L⁴, and by reason of this construction a seal is effected in the crucible I which prevents the furnace gases generated in the chamber H from flowing through the opening I² into chamber I³ and out through the conduit L into the ladle, and for the further purpose of providing means whereby the expansion of the gases in the chamber I³ will prevent the gases in the chamber H from entering the said chamber for the purpose hereinafter more fully explained.

The chamber B is provided with a cover B' which has an opening B² through which the products of combustion generated in the chamber B may escape. The chamber H is provided with a cover H' which is removed for the purpose of placing the crucible I within the chamber H. In placing the crucible I in the chamber H, the conduit portion L is first arranged parallel with the inside of the wall H² and the crucible is lowered to the bottom of the chamber in this position and afterward shoved under the spout G and the conduit portion swung into position, so that the outlet nozzle L³ will project through the opening K' as illustrated.

It will be noticed that a space indicated by N is provided to permit the heated gases in the chamber H to circulate around the conduit L to keep the copper in a perfectly fused condition, so that it will flow readily to the ladle M.

It will be noticed that the lower end of the wall F, indicated by F', extends to a point even with or below the point F², so that a seal is provided by the copper between the chambers H and B to prevent the gases from flowing from one of said chambers to the other.

After the copper has been placed in the chamber B the blow pipe D is operated and the blow pipe J is operated to thoroughly heat up the interior of the said chambers and after the chambers are heated and the copper begins to melt, it flows from the chamber B as it is fused through the spout G to the cover I' of the crucible I and through the opening I² therein to the chamber I³ within said crucible.

The greater portion of the volatile gases are driven off in the melting of the copper in the chamber B and after the copper has flowed into chamber I³ the volatile gases still remaining in the copper are forced out of same through the opening I⁴ in the cover and due to the expansion and tension of the heated gases within the chamber I³ the products of combustion in the chamber H are prevented from entering the said chamber I³, so that after the copper is freed from impurities, the copper may flow directly to the ladle M which is removed from the furnace gases and is then ready for casting in a pure condition.

As an illustration, we have described one construction by which it is possible to establish the necessary conditions to demonstrate the principle of natural law by which the separation of molten copper from contaminating vapors, and deteriorating gases, is accomplished. We are aware that other constructions can be made to establish the same conditions, and wish to state in this connection that we do not desire to claim any specific construction in this application for the carrying out of our process. What we desire to point out and protect by securing Letters Patent is the discovery that certain established conditions as described by us, will cause the separation of molten copper from contaminating vapors, and deteriorating gases. The conditions being established, the separation of the molten copper from contaminating vapors, and deteriorating gases, occur as follows: The copper having been fused and exposed to the action of the furnace gases in furnace compartment B, becomes contaminated with vapors, gaseous impurities and volatile substances. This molten contaminated copper flowing out of the fusing furnace compartment B, through the siphon conduit and spout G, flows from same through the chamber opening I², into the heated chamber I³, and continues its flow through the said chamber and through and out of the siphon conduit L to the ladle, as previously described, the volatile impurities that contaminated the molten copper separate from the copper, as the copper enters the chamber I³, the reason for this is that the chamber I³, being in a highly heated state, the temperature being maintained above the melting point of copper, contains a highly rarefied atmosphere of nitrogen, which repels by its heat the entrance of outside volatile substances, vapors, and gases.

Having thus described our invention we claim as new:

1. The process of fusing and purifying copper, consisting in first fusing the copper by the application of the direct action of the furnace gases in one chamber, then leading the copper into another chamber and heating said chamber and the copper therein to a sufficient degree to expel the greater part of the remaining gaseous impurities while the metal is protected from contact with the furnace gases used in the heating operation by a cover of inert gas, and then flowing the copper from said second chamber.

2. The process of fusing and purifying copper consisting in first fusing the copper by the heat of and in contact with combustible gases, then leading the copper from contact with said gases and beneath a cover of heated nitrogen gas and further heating the copper to gasify and drive off the remaining gaseous impurities, thereby eliminating such impurities from the copper.

In testimony whereof, we affix our signatures, in presence of two witnesses.

WALTER S. ROCKEY.
HILLIARY ELDRIDGE.

Witnesses:
FRANK M. ASHLEY,
G. F. QUACKINBUSH.